United States Patent
Cheng

(10) Patent No.: US 11,483,202 B2
(45) Date of Patent: Oct. 25, 2022

(54) METHOD FOR AUTOMATICALLY CONFIGURING ROUTER AND ROUTING SYSTEM

(71) Applicant: WISTRON NEWEB CORPORATION, Hsinchu (TW)

(72) Inventor: Wen-Yuen Cheng, Hsinchu (TW)

(73) Assignee: WISTRON NEWEB CORPORATION, Hsinchu (TW)

(*) Notice: Subject to any disclaimer, the term of this patent is extended or adjusted under 35 U.S.C. 154(b) by 0 days.

(21) Appl. No.: 16/994,716

(22) Filed: Aug. 17, 2020

(65) Prior Publication Data

US 2021/0099344 A1  Apr. 1, 2021

(30) Foreign Application Priority Data

Sep. 27, 2019 (TW) .................................. 108135237

(51) Int. Cl.
*H04L 41/0816* (2022.01)
*H04L 41/084* (2022.01)
(Continued)

(52) U.S. Cl.
CPC ...... *H04L 41/0816* (2013.01); *H04L 41/0846* (2013.01); *H04L 41/16* (2013.01);
(Continued)

(58) Field of Classification Search
CPC . H04L 41/0816; H04L 41/0846; H04L 41/16; H04L 43/067; H04L 43/04;
(Continued)

(56) References Cited

U.S. PATENT DOCUMENTS 7,145,871 B2 * 12/2006 Levy .................. H04L 41/06
                                                   370/229
9,077,928 B2 *  7/2015 Milano .............. G06F 3/04883
(Continued)

FOREIGN PATENT DOCUMENTS

WO  WO-2014/011200 A1 *  2/2015 ........... H04L 12/407
WO  WO 2015/181803 A1 * 12/2015

OTHER PUBLICATIONS

C. Brand and R. Wolhuter, "Traffic Class Prediction and Prioritization on a Diversified IP Network Using Machine Learning," 2009 IEEE Globecom Workshops, 2009, pp. 1-6. (Year: 2009).*
(Continued)

*Primary Examiner* — Patrice L Winder
(74) *Attorney, Agent, or Firm* — McClure, Qualey & Rodack, LLP

(57) ABSTRACT

A method for automatically configuring router and a routing system are provided. The method is operated in a routing system including a router, a user equipment and an analysis platform, and the method includes the following steps. The router collects related data used by the user equipment to connect to the Internet, and stores the data in a memory. When each time the router determining that a first event meets a first preset condition, the router uploads the data to the analysis platform. The analysis platform uses a computational model to analyze the data, and stores an analysis result in the analysis platform. When the analysis platform each time determines that a second event meets a second preset condition, the analysis platform forms a configuration file, and loads the configuration file into the router, so that the router performs a configuration work according to the configuration file.

8 Claims, 7 Drawing Sheets

(51) Int. Cl.
  *H04L 41/16* (2022.01)
  *H04L 43/067* (2022.01)
  *H04L 43/04* (2022.01)
  *H04L 43/065* (2022.01)
(52) U.S. Cl.
  CPC ............ *H04L 43/04* (2013.01); *H04L 43/065* (2013.01); *H04L 43/067* (2013.01)
(58) Field of Classification Search
  CPC . H04L 43/065; H04L 41/0886; G06N 3/0454; G06N 3/08
  See application file for complete search history.

(56) References Cited

U.S. PATENT DOCUMENTS

| | | | | |
|---|---|---|---|---|
| 9,088,422 | B2* | 7/2015 | Diab | H04L 12/2834 |
| 9,148,381 | B2* | 9/2015 | Dunlap | H04L 41/0816 |
| 10,038,609 | B2* | 7/2018 | Shanks | H04L 43/028 |
| 10,708,195 | B2* | 7/2020 | Chapman | H04L 12/2878 |
| 10,841,238 | B2* | 11/2020 | Zavesky | H04L 47/823 |
| 10,963,333 | B1* | 3/2021 | Nijim | G06F 11/3006 |
| 2009/0070425 | A1* | 3/2009 | Heumesser | H04L 41/0856 |
| | | | | 709/205 |
| 2010/0002580 | A1* | 1/2010 | DelRegno | H04L 47/70 |
| | | | | 370/252 |
| 2015/0067113 | A1* | 3/2015 | Dankwardt | H04L 41/0816 |
| | | | | 709/221 |
| 2015/0207720 | A1* | 7/2015 | Dagum | H04L 41/32 |
| | | | | 370/252 |
| 2016/0065408 | A1* | 3/2016 | Yermakov | H04L 41/5003 |
| | | | | 370/254 |
| 2016/0366017 | A1* | 12/2016 | Graczykowski | H04L 47/24 |
| 2017/0104633 | A1* | 4/2017 | Wen | H04L 41/0896 |
| 2017/0264501 | A1* | 9/2017 | Mathen | H04L 41/16 |
| 2018/0123901 | A1* | 5/2018 | Yermakov | H04L 43/0894 |
| 2019/0089748 | A1* | 3/2019 | Manor | H04L 63/205 |
| 2019/0289038 | A1* | 9/2019 | Li | H04L 67/56 |
| 2021/0067607 | A1* | 3/2021 | Gardner | H04L 41/082 |
| 2021/0092026 | A1* | 3/2021 | Di Pietro | H04L 41/22 |

OTHER PUBLICATIONS

User-driven dynamic traffic prioritization for home networks J Martin, N Feamster W-MUST'12: Proceedings of the 2012 ACM SIGCOMM workshop on Measurements up the stack, Aug. 2012, pp. 19-24, Association for Computing Machinery. (Year: 2012).*

FlowQoS: QoS for the rest of us, M. Said Seddiki et al., HotSDN '14: Proceedings of the third workshop on Hot topics in software defined networking, Aug. 2014, pp. 207-208, Association for Computing Machinery. (Year: 2014).*

* cited by examiner

METHOD FOR AUTOMATICALLY CONFIGURING ROUTER AND ROUTING SYSTEM

CROSS-REFERENCE TO RELATED PATENT APPLICATION

This application claims the benefit of priority to Taiwan Patent Application No. 108135237, filed on Sep. 27, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a method for configuring a router, and more particular to a method and a routing system for automatically configuring a router.

BACKGROUND OF THE DISCLOSURE

An existing router operates according to a default configuration file after leaving the factory. However, if the user wants to change a configuration of the router, a Graphical User Interface (GUI) must be accessed to edit the configuration manually, unless the user has considerable knowledge in understanding the inner workings of the Internet for better settings by themselves. For users who are not familiar with the inner workings of the Internet, sometimes the configuration requirements to be changed for several times to achieve the desired connection effect. Therefore, designing a method capable of automatically configuring a router has become an important topic in the art.

SUMMARY OF THE DISCLOSURE

In response to the above-referenced technical inadequacies, an embodiment of the present disclosure provides a method for automatically configuring router and a routing system, the method is operated in the routing system, which includes a router, a user equipment and an analysis platform, and the method includes the following steps: configuring the router to collect related data used by the user equipment to connect to the Internet, and store the data in a memory of the router, and configuring the router, in response to the router determining that a first event meets a first preset condition, to upload the data to the analysis platform. Configuring the analysis platform to analyze the data by using a computational model to generate an analysis result, and store the analysis result in the analysis platform, and configuring the analysis platform, in response to the analysis platform determining that a second event meets a second preset condition, to form a configuration file of the router, and load the configuration file into the router, thereby making the router perform at least one configuration work according to the configuration file.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1A:
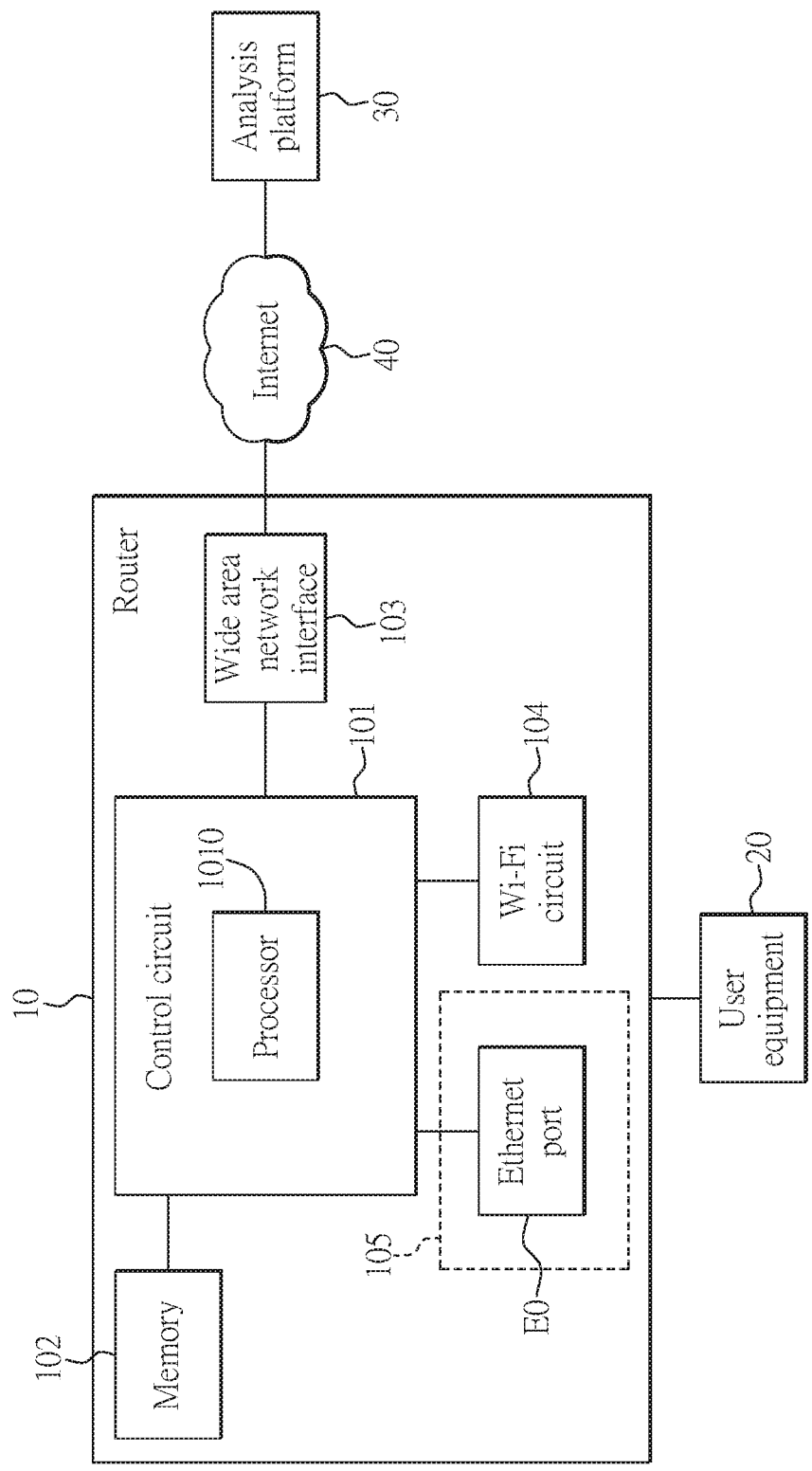
FIG. 1A is a block diagram of a routing system provided by an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
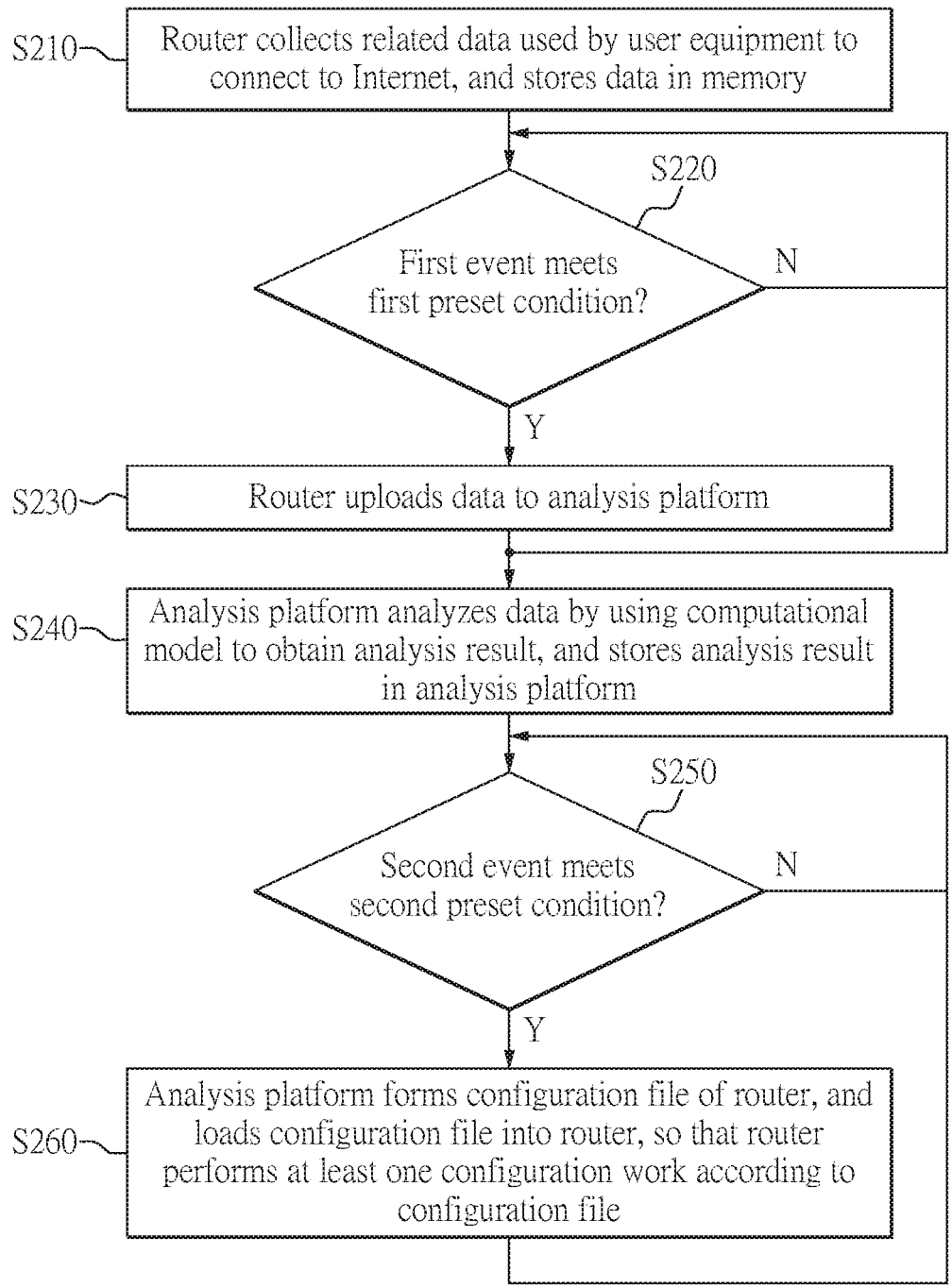
FIG. 2 is a flowchart of a method for automatically configuring a router according to an embodiment of the present disclosure.

First, reference is made to FIGS. 1A and 2, FIG. 1A is a block diagram of a routing system provided by an embodiment of the present disclosure, and FIG. 2 is a flowchart of a method for automatically configuring a router according to an embodiment of the present disclosure. It should be noted that the method of FIG. 2 can be operated in the routing system 1 of FIG. 1A, but the present disclosure does not limit that the method of FIG. 2 to be executed only in the routing system 1 of FIG. 1A. As shown in FIG. 1A, the routing system 1 includes a router 10, a user equipment 20, and an analysis platform 30. However, in order to facilitate the following description, the number of user equipment in this embodiment is only one, but in other embodiments, the routing system 1 may also include a plurality of user equipments 20_1-20_M, that is, M is a positive integer greater than 1. In summary, the present disclosure does not limit the number of user equipment in the routing system 1. In addition, in this embodiment, the user equipment 20 can be implemented by, for example, a desktop computer, a notebook, a smart phone, a tablet, or any electronic device with an Internet connection function, but the present disclosure is not limited thereto.

It should be understood that the user equipment 20 can be connected to the router 10 through a local area network (LAN) or wireless LAN (WLAN), and the router 10 is further used to connect the user equipment 20 to the Internet 40 through a wide area network (WAN). Therefore, as shown in FIG. 1A, the router 10 can mainly include a control circuit 101, a memory 102, a wide area network interface 103, and at least one local area network interface. In practice, since WiFi® and Ethernet are the most commonly used technologies in today's WLAN and LAN, respectively, thus the at least one local area network interface of the router 10 can include, for example, a Wi-Fi circuit 104 and an Ethernet circuit 105, and the Ethernet circuit 105 includes at least one Ethernet port, but the present disclosure is not limited thereto. In order to facilitate the following description, the number of Ethernet ports in the present embodiment being one is also taken as an example, that is, an Ethernet port E0. In other words, in addition to the user equipment 20 capable of connecting to the Internet 40 through the Ethernet port E0 of the router 10, the user equipment 20 can also connect to the Internet 40 through the Wi-Fi circuit 104 of the router 10, but the present disclosure is not limited thereto.

In the present embodiment, the control circuit 101 can include a processor 1010. The processor 1010 is implemented by, for example, a single central processing unit or a plurality of parallel processors associated with parallel processing environments, and the memory 102 can be preferably implemented by a flash memory, but the present disclosure is not limited thereto. In brief, the present disclosure does not limit the specific implementation of the control circuit 101 and the memory 102. Those skilled in the arts should be able to design the control circuit 101 and the memory 102 according to actual requirements or applications. As shown in FIG. 2, after the router 10 is powered on (Boot Up), the router 10 provides routing and forwarding mechanisms according to a preset configuration file. In a step S210, the router 10 collects related data used by the user equipment 20 to connect to the Internet 40, and stores the data in the memory 102.

It should be noted that the step S210 can be a step that is continuously executed, that is, the step S210 and the other steps in FIG. 2 may be steps that are executed in parallel without conflict. For example, in response to each time the user equipment 20 requesting to perform a network service while connecting to the Internet 40 through the router 10, the router 10 retrieves an Internet protocol (IP) address of the user equipment 20 and service information of the network service required by the user equipment 20 to be executed from a packet transmitted from a wide area network interface 103 to the Internet 40, and summarize and organize a time stamp, the Internet protocol address, and the service information as one of the entries of the data to be stored in the memory 102. That is, the data stored in the memory 102 is a plurality of entries, and at least one entry of the data includes the time stamp, the Internet protocol address, and the service information.

In addition, in the step S220, the router 10 determines whether a first event meets a first preset condition. In response to the router 10 determines that the first event meets the first preset condition, the routing system 1 performs a step S230. In response to the router 10 determining that the first event does not meet the first preset condition, the routing system 1 returns to perform the step S220 until the first event meets the first preset condition. In the step S230, the router 10 uploads the data to the analysis platform 30. After the step S230 is performed, the routing system 1 performs steps S240 to S260, and the routing system 1 also returns to perform the step S220. In other words, the steps S220 to S230 and the steps S240 to S260 can be steps that are performed in parallel without conflict. However, the present disclosure does not limit a specific implementation manner of the routing system 1 when the step S220 is performed for the first time. Those skilled in the arts should be able to design according to actual requirements or applications.

In the step S240, the analysis platform 30 analyzes the data by using the computational model to obtain an analysis result, and stores the analysis result in the analysis platform 30. In the step S250, the analysis platform 30 determines whether a second event meets a second preset condition. In response to the router 10 determines that the second event meets the second preset condition, the routing system 1 performs the step S260. In response to the router 10 determining that the second event does not meet the second preset condition, the routing system 1 returns to perform the step S250 until the second event meets the second preset condition. In the step S260, the analysis platform 30 forms a configuration file of the router 10, and loads the configuration file into the router 10, so that the router 10 performs at least one configuration work according to the configuration file. Similarly, after the step S260 is performed, the routing system 1 also returns to the step S250. Therefore, the step S240 and the steps S250 to S260 can also be performed in parallel without conflict.

In practice, the analysis platform 30 can include appropriate logic, circuits, and/or codes, and the computational model is a mathematical model in computing science, which uses a large amount of computing resources to study behaviors of a complex system. Therefore, in order to be able to complete all calculations in a short time, the analysis platform 30 of this embodiment can preferably be implemented by a server, but the present disclosure is not limited thereto, and it should be understood that the server (analysis platform 30) can also be connected to the router 10 through the Internet 40, as shown in FIG. 1A. That is, since the server can provide services to an internal network through the Internet 40, in a case that the analysis platform 30 is implemented by the server, one of the advantages is that the present disclosure can be further provided with a "remote" configuration effect.

Figure 1B:
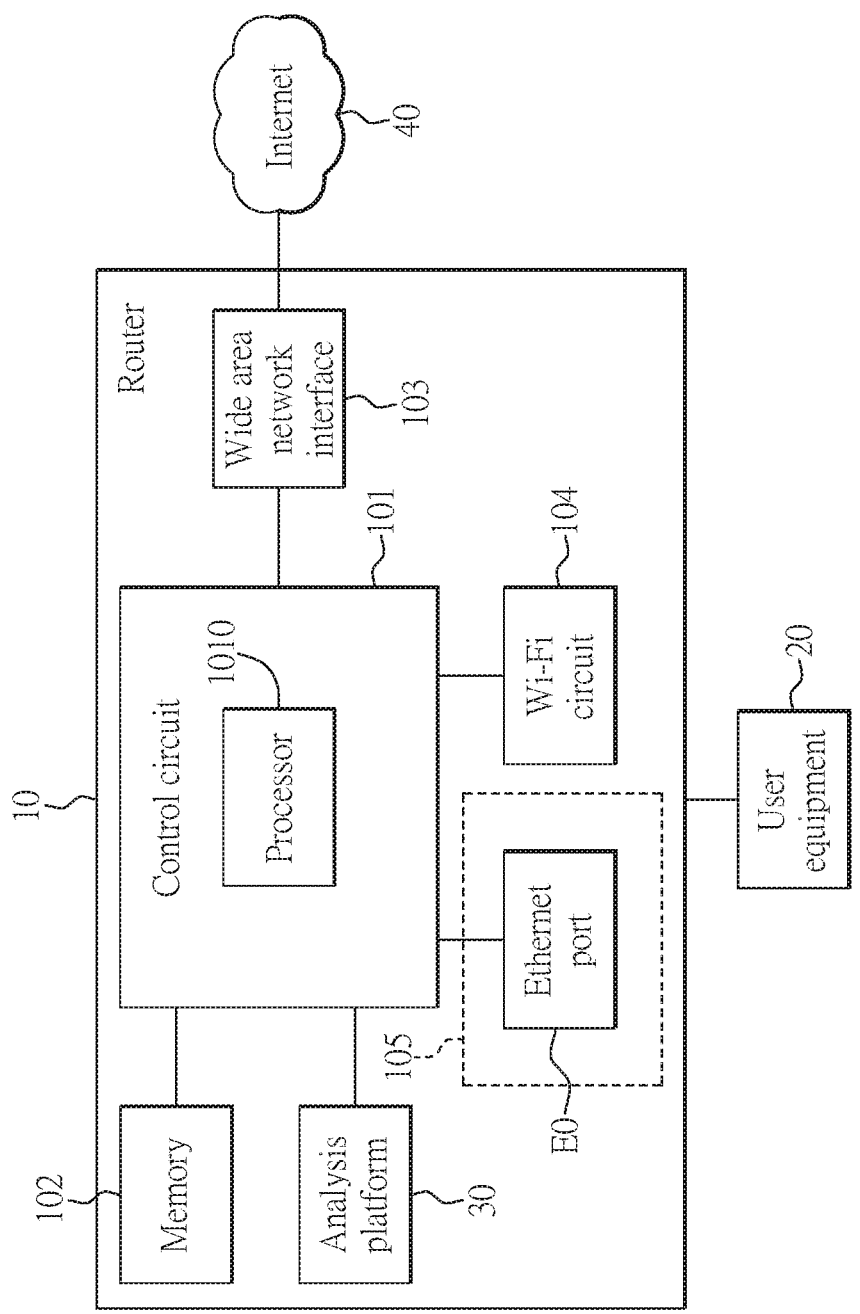
FIG. 1B is a block diagram of an analysis platform in the routing system of FIG. 1A according to another preferred embodiment of the present disclosure.

Certainly, if the router 10 itself has high computing power, the analysis platform 30 can also be directly integrated into the router 10, as shown in FIG. 1B, but the present disclosure is not limited thereto, and in a case that the analysis platform 30 is integrated into the router 10, one of the benefits is that the router 10 can upload the data and load the configuration file without the Internet 40. In brief, the present disclosure does not limit the specific implementation of the analysis platform 30. Those skilled in the arts should be able to design the analysis platform 30 according to actual requirements or applications. However, in order to facilitate the following description, the analysis platform 30 will be described only in an implementation of FIG. 1A. In addition, the computational model used by the analysis platform 30 can be, for example, a machine learning algorithm model, a neural network model, or a deep learning algorithm model, but the present disclosure is not limited thereto. Since operation principles of the machine learning algorithm model, the neural network model, or the deep learning algorithm model are well known to those skilled in the arts, therefore details thereof are not repeated hereinafter.

On the other hand, since a port number in the packet can be used to indicate which protocol type the network service requested by the user equipment 20 belongs to, and the protocol type of the network service includes File Transfer Protocol (FTP), Simple Mail Transfer Protocol (SMTP), Real Time Streaming Protocol (RTSP), Hypertext Transfer Protocol (HTTP), and the like. Therefore, in the present embodiment, the service information retrieved from the packet by the router 10 is firstly assumed to refer to the "port number", but it is not intended to limit the present disclosure. For example, after the router 10 is powered on, the router 10 not only can connect to the Internet 40 to obtain the local standard time, such as Taipei time (GMT+8) at 12 o'clock on Monday, Jul. 8, 2019, the router 10 can also count an operating time, and a unit for counting may be, for example, an hour, but the present disclosure is not limited thereto.

Then, when the user equipment 20 takes the lead in connecting to the Internet 40 through the router 10 at 8 am on the same day to request an execution of an FTP network service, the router 10 will retrieve the Internet Protocol address (for example, 192.168.1.188) and port number: 21 of the user equipment 20 from a packet transmitted from the wide area network interface 103 to the Internet 40, and then summarize and organize a time stamp (i.e., Jul. 8, 2019/Monday/08:00), the Internet protocol address: 192.168.1.188 and the port number: 21 as a first entry of the data stored in the memory 102. It is worth mentioning that, in order to facilitate the following description, the time stamp in the present embodiment is only implemented by using an arrangement of the day/month/year/day of the week, and twenty-four hour clock, but the present disclosure does not limit a specific implementation for the time stamp, those skilled in the arts should be able to design according to actual requirements or applications.

In addition, in the step S220, the router 10 will determine whether the first event meets the first preset condition. As for an operation principle of the step S220, it will be described in detail in other embodiments hereinafter, so the details thereof will not be described here. Assuming that the first event has not yet met the first preset condition at this time, when the user equipment 20 then connects to the Internet 40 through the router 10 at 9:15 a.m. on the same day to request an execution of a World Wide Web (WWW) network service, the router 10 will retrieve the Internet Protocol address (for example, 192.168.1.188) and a port number: 21 of the user equipment 20 from a packet transmitted from the wide area network interface 103 to the Internet 40, and then summarize and organize a time stamp (i.e., Jul. 8, 2019/Mon./09:15), the Internet protocol address: 192.168.1.188 and the port number: 21 as a second entry of the data stored in the memory 102. Similarly, in the step S220, the router 10 determines whether the first event satisfies the first preset condition, and so forth. Until the router 10 first determines that the first event meets the first preset condition, the data stored in 102 has accumulated more than 1,000 entries, and thus when the step S230 is performed for the first time, the router 10 uploads the more than 1,000 entries to the analysis platform 30.

Figure 3A:
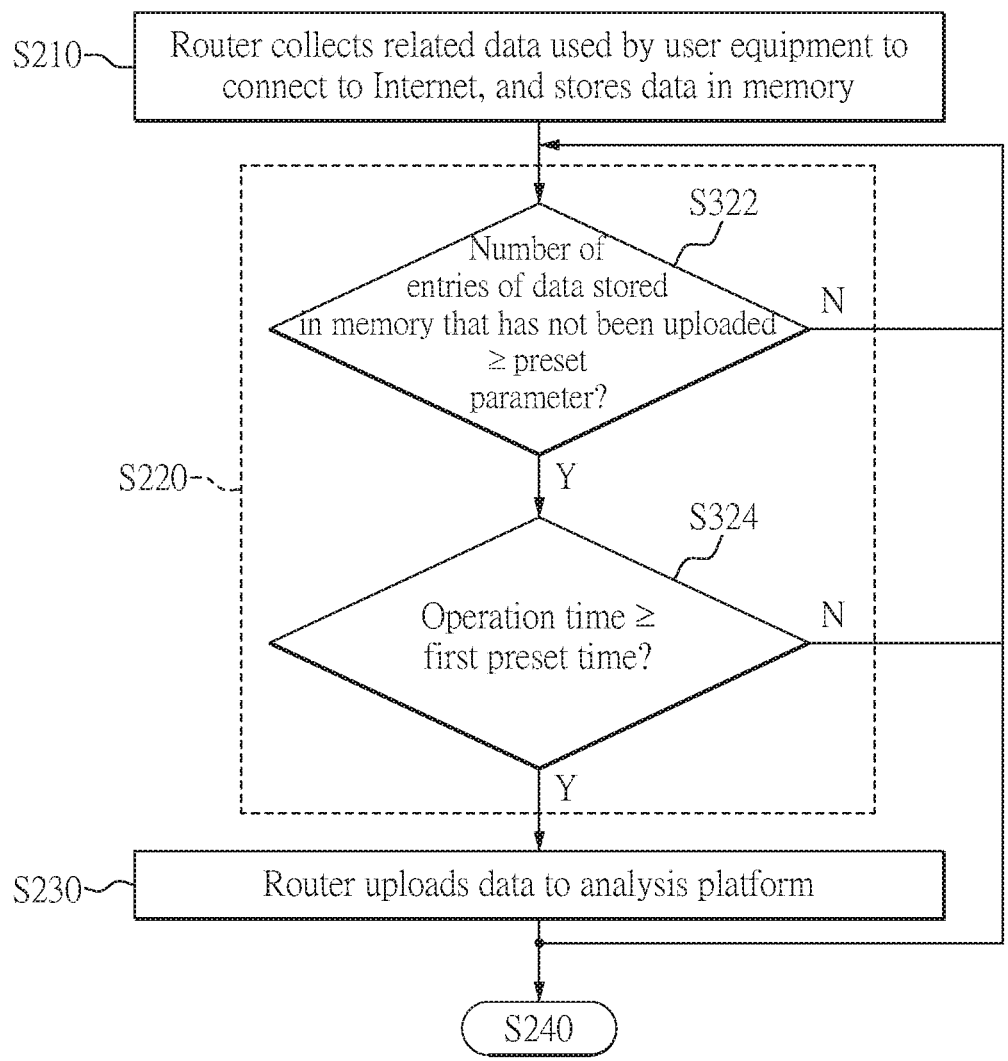
FIG. 3A is a flowchart of a step S220 in the method of FIG. 2 according to a preferred embodiment of the present disclosure.
Figure 3B:
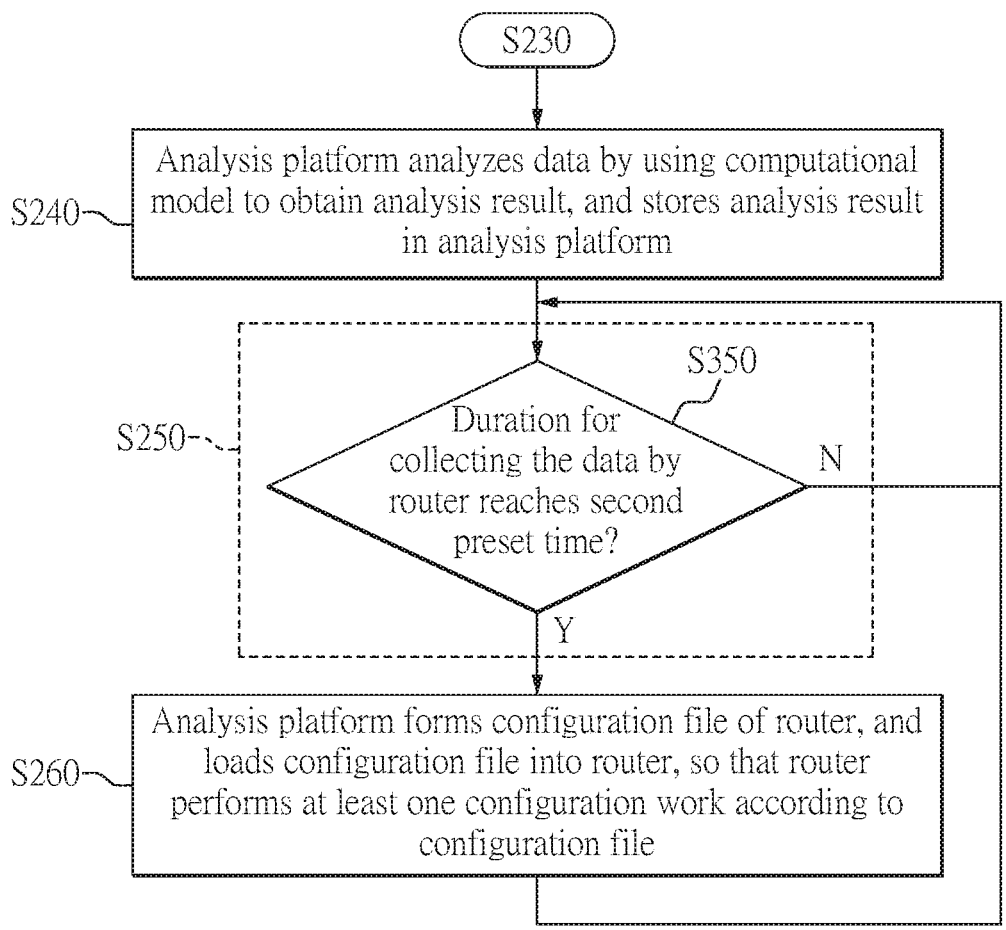
FIG. 3B is a flowchart of a step S250 in the method of FIG. 2 according to a preferred embodiment of the present disclosure.

On the other hand, as shown in FIG. 2, after the router 10 uploads the more than 1,000 entries of data to the analysis platform 30, the routing system 1 will return to perform the step S220, and so forth. Until the router 10 determines that the first event meets the first preset condition for the second time, since the data stored in the memory 102 at this time has accumulated more than 1,000 new entries, when the step S230 is performed for the second time, the router 10 uploads the more than 1000 new entries to the analysis platform 30. That is, each time the router 10 determines that the first event meets the first preset condition, the router 10 uploads a plurality of entries of the data stored in the memory 102 that have not been uploaded. Reference can be further made to FIGS. 3A and 3B, and FIGS. 3A and 3B are flowcharts of the steps S220 and S250 in the method of FIG. 2 according to a preferred embodiment of the present disclosure. In the embodiment of FIG. 3A, the step S220 can include steps S322 and S324.

In the step S322, the router 10 determines whether a number of the entries of the data stored in the memory 102 that has not been uploaded is greater than or equal to a preset parameter, such as 1000. In response to the router 10 determining the number of the entries of the data stored in the memory 102 that has not been uploaded is greater than or equal to the preset parameter, the routing system 1 continues to execute the step S324. In response to the router 10 determining the number of the entries of the data stored in the memory 102 that has not been uploaded is less than the preset parameter, the routing system 1 returns to perform the step S322. In the step S324, the router 10 determines whether an operation time thereof is greater than or equal to a first preset time, such as 24 hours (1 day). In response to the router 10 determining the operation time thereof is greater than or equal to the first preset time, the routing system 1 performs the step S230. In response to the router 10 determining the operation time thereof is less than the first preset time, the routing system 1 returns to perform the step S322, until the number of the entries of the data stored in the memory 102 that has not been uploaded is greater than or equal to the preset parameter and the operation time of the router 10 is greater than or equal to the first preset time. It should be noted that if the router 10 uploads data to the analysis platform 30 since that the operation time is determined to exceed the first preset time, for example, 24 hours (1 day), the router 10 must recount the operation time to prevent the routing system 1 from producing a faulty determination when returning from the step S230 to the step S220.

In addition, an order of the steps S322 and S324 in FIG. 3A is only for example, and it is not intended to limit the present disclosure. In other embodiments, the routing system 1 may also reverse the order of steps S322 and S324, which does not affect the implementation of the present disclosure. Or, in other embodiments, one of the steps S322 and S324 may be used without the other step. For example, regardless of the number of the entries of the data, each time the router 10 determines that the operation time reaches the first preset time, for example, 24 hours (1 day), the router 10 will upload the plurality of entries of data stored in the memory 102 that has not been uploaded at this time to the analysis platform 30. Alternatively, regardless a length of the operation time, when the router 10 determines that the number of the entries of the data stored in the memory 102 that has not been uploaded reaches the preset parameter, such as 1000, the router 10 will only upload these 1,000 entries to the analysis platform 30. In brief, when the operation time of the router 10 reaches 24 hours (1 day), the data stored in the memory 102 that has not been uploaded accumulates more than 1,000 entries. Therefore, in this embodiment, this characteristic can be used as a determination condition to effectively upload data to the analysis platform 30 in batches, thereby reducing a calculation load of the computational model.

Then, after the router 10 is powered on Monday, Jul. 8, 2019, Taipei time, a first batch of data received by the analysis platform 30 can represent all of Internet activities of the user equipment 20 on Monday, Jul. 8, 2019, Taipei time. Therefore, when the step S240 is performed for the first time, the analysis platform 30 can use the computational model to analyze the first batch of the data to obtain online habits of the user equipment 20 on "Monday", and in the present embodiment, the result at this time may be referred to as an analysis result R (1), and the analysis result R (1) can be stored in the analysis platform 30, and so forth. Since a seventh batch of data received by the analysis platform 30 can represent all of Internet activities of the user equipment 20 on Sunday, Jul. 14, 2019, Taipei time, thus when the step S240 is performed for the seventh time, the analysis platform 30 can use the computational model to analyze the seventh batch of the data to obtain online habits of the user equipment 20 on "Sunday", and in this embodiment, the result at this time can be referred to as an analysis result R (7), and the analysis result R (7) is stored in the analysis platform 30.

On the other hand, as shown in FIG. 3B, the step S250 can be implemented by, for example, the step S350, but the present disclosure is not limited thereto. In the step S350, the analysis platform 30 determines whether a duration for collecting the data by the router 10 reaches a second preset time, for example, 7 days (1 week). For example, when the analysis platform 30 first determines that the duration for collecting the data by the router 10 reaches 7 days (1 week), since the analysis result saved by the analysis platform 30 at this time has been accumulated from the analysis result R (1) to the analysis result R (7), thus the analysis platform 30 forms a configuration file of the router 10 according to the analysis results R (1) to R (7), and loads the configuration file into the router 10, thereby making the router 10 to perform at least one configuration work. As for what the configuration work is will be explained in detail by other examples, the details will not be described here. It should be noted that if the router 10 form the configuration file of the router 10 since that the duration for collecting the data by the router 10 is determined to reach 7 days (1 week), the analysis platform 30 must recount the duration to prevent the routing system 1 from producing a faulty determination when returning from the step S260 to the step S350.

In contrast, since an eighth batch of data received by the analysis platform 30 can represent all of Internet activities of the user equipment 20 on Monday, Jul. 15, 2019, Taipei time. Therefore, when the step S240 is performed for the eighth time, the analysis platform 30 can further use the computational model to analyze the eighth and first batches of the data to obtain online habits of the user equipment 20 on "Monday" again, and in the present embodiment, the result at this time may be referred to as an analysis result R (8), and the analysis result R (8) can be stored in the analysis platform 30, and so forth. Since a fourteenth batch of data received by the analysis platform 30 can represent all of Internet activities of the user equipment 20 on Sunday, Jul. 21, 2019, Taipei time, thus when the step S240 is performed for the fourteenth time, the analysis platform 30 can use the computational model to analyze the fourteenth batch of the data to obtain online habits of the user equipment 20 on "Sunday", and in this embodiment, the result at this time can be referred to as an analysis result R (14), and the analysis result R (14) is stored in the analysis platform 30.

Similarly, when the analysis platform 30 determines for the second time that the duration for collecting the data by the router 10 reaches 7 days (1 week), since the analysis result stored by the analysis platform 30 at this time has been accumulated from the analysis result R (8) to the analysis result R (14), thus the analysis platform 30 forms a configuration file of the router 10 according to the analysis results R (8) to R (14), and loads the configuration file into the router 10, thereby making the router 10 to perform at least one configuration work. That is, since the analysis platform 30 expects that the users of the user equipment 20 will maintain the same online habits every week, each time when the analysis platform 30 obtains the online habits of the users of the user equipment 20 on Monday to Sunday, the analysis platform 30 can form a corresponding configuration file to actively modify (update) the configuration of the router 10. It should be noted that after the analysis platform 30 receives an Nth batch of data, where N is a positive integer greater than 7, the analysis platform 30 analyzes the Nth batch of data and an N-7th batch of data, such as data on Monday of this week and data on Monday of the previous week, but the present disclosure is not limited thereto.

It should be understood that if the analysis platform 30 takes more batches of data for analysis each time, the analysis platform 30 can obtain more accurate analysis results, but it also increases the calculation load of the computational model. Therefore, the present disclosure does not limit a specific implementation manner for the analysis platform 30 to analyze the data. Those skilled in the arts should be able to design according to actual requirements or applications. In addition, the second preset time in FIG. 3B may be greater than or equal to the first preset time in FIG. 3A. For example, if the analysis platform 30 is changed to expect that the users of the user equipment 20 will maintain the same online habits every day, that is, the second preset time and the first preset time are 1 day. Each time when the online habits of the users of the user equipment 20 within one day are obtained, the analysis platform 30 can form a corresponding configuration file to actively modify (update) the configuration of the router 10. In brief, the router 10 is mainly used in a home or a small office, and the users of the user equipment 20 are relatively regular, and online habits of the users usually do not change much in a short term. Therefore, this embodiment will be able to make use of this feature to analyze (statistically) the online habits of the users to modify the configuration of the router 10 at certain specific times, that is, to perform at least one configuration task.

For example, in the step S240 that the analysis platform 30 analyzes the data, the analysis platform 30 may obtain certain protocol types (for example, FTP) based on the time stamp, the Internet protocol address, and the port number of at least one entry of data to obtain an analysis result indicating that the network service of the protocol type (for example, FTP) is often required by the user equipment 20 to be executed at a specific time (for example, from 08:00 to 09:00 on Monday), and then in the step S260 that the analysis platform 30 forms the configuration file, the analysis platform 30 can form the configuration file of the router 10 according to the analysis result, and load the configuration file into the router 10, thereby configuring the router 10 to allocate a fixed bandwidth to the network service of the protocol type at the specific time according to the configuration file. That is, when the user of the user equipment 20 requests (on the next) Monday from 08:00 to 09:00 to perform the FTP network service, the user of the user equipment 20 does not need to manually modify the configuration of the router 10. Instead, the analysis platform 30 has taken an initiative to modify (update) the configuration of the router 10 to ensure that the bandwidth is preserved for the FTP network service at this specific time, so as to obtain an ideal connection effect and even improve the user experience.

It should be noted that the specific time mentioned above is only described by using a single period of a single day, but it is not intended to limit the present disclosure. In addition, if the foregoing content is taken as an example, in addition to the analysis platform 30 being able to obtain that the FTP network service is often required by the user equipment 20 from 08:00 to 09:00 on Monday, the analysis platform 30 can also obtain that a RTSP network service is often requested by the user equipment 20 from 20:00 to 22:00 on Wednesday and from 21:00 to 23:00 on Friday. Therefore, the configuration file formed by the analysis platform 30 can also configure the router 10 to allocate a fixed bandwidth to the RTSP network services at the above specific time. In brief, the analysis platform 30 can obtain the online habits of the user equipment 20 at different times according to the received data. Therefore, the analysis platform 30 can automatically divide the configuration file into different sectors for modifying the configuration of the router 10 at different times.

In addition, web browsing is the most common network service, and the router 10 can obtain a web address browsed by the user equipment 20 from the packet. Therefore, in this embodiment, it can also be assumed that the service information retrieved from the packet by the router 10 refers to the "web address", but it is not intended to limit the present disclosure. Similarly, in the step S240 that the analysis platform 30 analyzes the data, the analysis platform 30 can analyze the data based on the time stamp, the Internet protocol address, and the web address of at least one entry of data to obtain an analysis result indicating that the certain web address (for example, https://www.youtube.com/) is often required by the user equipment 20 to be executed at a specific time (for example, from 12:00 to 14:00 and from 18:00 to 19:00 on Monday to Friday, and from 20:00 to 22:00 on Saturday and Sunday), and then in the step S260 that the analysis platform 30 forms the configuration file, the analysis platform 30 can form the configuration file of the router 10 according to the analysis result, and load the configuration file into the router 10, thereby configuring the router 10 to, according to the configuration file, preload a content of the web address in advance before the specific time arrives, or adjust a bandwidth of the user equipment 20 at the specific time to improve a quality of web browsing or accelerate a loading speed of a web.

To put it simply, in the step S240 that the analysis platform 30 analyzes the data, the analysis platform 30 can analyze the data based on the time stamp, the Internet protocol address, and the service information of at least one entry of the data to obtain an analysis result indicating that the Internet 40 is often connected by the user equipment 20 through the router 10 at a specific time (for example, from 08:00 to 15:00 and from 17:00 to 23:00 on Monday to Friday, and from 18:00 to 23:00 on Saturday and Sunday), and then in the step S260 that the analysis platform 30 forms the configuration file, the analysis platform 30 can form the configuration file of the router 10 according to the analysis result, and load the configuration file into the router 10, thereby configuring the router 10 to, according to the configuration file, reserve a fixed bandwidth for the user equipment 20 to use at the specific time, or prioritize processing of the network service required by the user equipment 20 at the specific time. It should be noted that with a formation of the IEEE 802.11 standard, Wi-Fi can be divided into 2.4 GHz or 5 GHz frequency bands. Therefore, the Wi-Fi circuit 104 can further include two radio frequency circuits (both not shown in FIG. 1A and FIG. 1B) for receiving and transmitting wireless signals of these two different frequency bands, and the two radio frequency circuits can be referred to as Radio_1 and Radio_2, for example, Radio_1 is used to send and receive wireless signals in the 2.4 GHz frequency band, and Radio_2 is used to send and receive wireless signals in the 5 GHz frequency band. In brief, the present disclosure does not limit the specific implementation of Radio_1 and Radio_2. Those skilled in the arts should be able to design according to actual requirements or applications.

As mentioned above, in addition to the user equipment 20 can be connected to the Internet 40 through the Ethernet port E0 of the router 10, the user equipment 20 can also be connected to the Internet 40 through the Radio_1 or Radio_2 of the router 10. Therefore, in this embodiment, the Ethernet port E0, Radio_1, or Radio_2 can be referred to as physical port, and after the router 10 already knows which physical port the user equipment 20 is connected to the Internet 40, the router 10 can manage the bandwidth for the physical port to adjust the bandwidth of the user equipment 20 or reserve a fixed bandwidth for the user equipment 20 to be used. For example, if the user equipment 20 is connected to the Internet 40 through the Ethernet port E0 of the router 10, the processor 1010 can manage a bandwidth of data transmission from the Ethernet port E0 to the control circuit 101 and then to the Internet 40, or manage a bandwidth of data transmission from the Internet 40 to the control circuit 101, and then to the Ethernet port E0. In addition, since an Ethernet port can only be connected to one electronic device (for example, user equipment 20), in a case that the router 10 includes multiple Ethernet ports (for example, Ethernet ports E0 and E1), the router 10 can also reduce a data transmission rate of other Ethernet ports to relatively increase the bandwidth of Ethernet port E0.

However, for Radio_1 and Radio_2, there may be a plurality of electronic devices connected to the same radio frequency circuit. Therefore, if the user equipment 20 is connected to the Internet 40 through Radio_1 or Radio_2 of the router 10, router 10 can also obtain a media access control address of the user equipment 20 from a media access control table (MAC Table), and then manage the connection bandwidth between the user equipment 20 and Radio_1 or Radio_2. In brief, the present disclosure does not limit a specific implementation manner for the router 10 to adjust the bandwidth of the user equipment 20 according to the configuration file, or to reserve the fixed bandwidth for the user equipment 20. Those skilled in the arts should be able to design according to actual requirements or applications. As for how the router 10 knows the physical port through which the user equipment 20 is connected to the Internet 40, the operation principle is also known to those skilled in the art, so the details thereof will not be repeated here.

Figure 4:
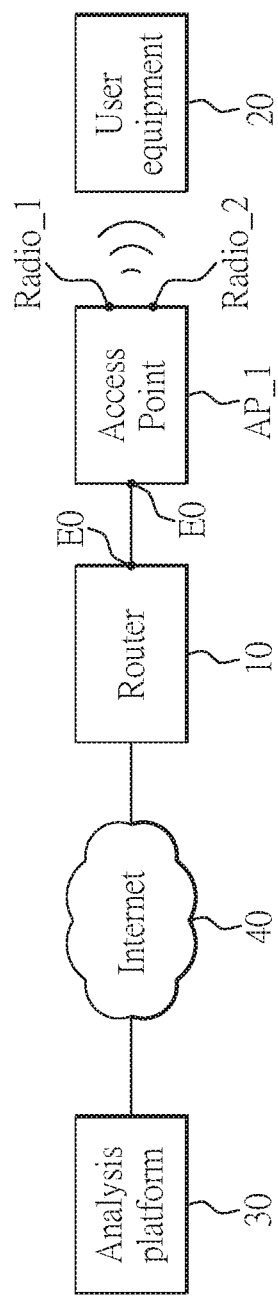
FIG. 4 is a block diagram of the routing system of FIG. 1A according to another preferred embodiment of the present disclosure.

Similarly, reference is made to FIG. 4, which is a block diagram of the routing system of FIG. 1A according to another preferred embodiment of the present disclosure. Compared with the embodiment of FIG. 1A, the routing system 1 in FIG. 4 further includes an access point (AP) AP_1. However, in order to facilitate the following description, an example that the number of the access point in FIG. 4 being one is only taken here, but in other embodiments, the routing system 1 can also include a plurality of user equipments 20_1-20_M, that is, M is a positive integer greater than 1. In brief, the present disclosure does not limit the number of access points in the routing system 1, and the present disclosure does not limit the specific implementation of the access point AP_1. Those skilled in the arts should be able to design according to actual requirements or applications. In this embodiment, the configuration file of the access point AP_1 is updated by the router 10, and the access point AP_1 is a device that connects a wireless network to a wired network. Therefore, the access point AP_1 itself may also include the Ethernet circuit 105 and the Wi-Fi circuit 104 (not shown in FIG. 4), and in order to facilitate the following description, an example that a number of the Ethernet port of the Ethernet circuit 105 of the access point AP_1 being one is also taken here. In addition, the Wi-Fi circuit 104 of the access point AP_1 may also include Radio_1 and Radio_2 for receiving and transmitting wireless signals in the 2.4 GHz and 5 GHz frequency bands, respectively.

In this embodiment, the router 10 can realize a path directed to the user equipment 20 from a routing table thereof. In other words, the router 10 can realize from the media access control table that the Ethernet port E0 thereof has corresponding records of the media access control address of the user equipment 20 and the media access control address of the access point AP_1. Therefore, the router 10 can realize that the user equipment 20 is connected to the router 10 through the access point AP_1. However, even if the router 10 cannot know which physical port of the access point AP_1 the user equipment 20 is connected to, the access point AP_1 can obtain the media access control address of the user equipment 20 from a media access control table thereof, and realize that the user equipment 20 is connected to Radio_1 or Radio_2 thereof, and thus the router 10 can also notify the access point AP_1 to manage the connection bandwidth between the Radio_1 or Radio_2 and the user equipment 20. In addition, in other embodiments, the access point AP_1 can also be connected to the router 10 through a wireless network, but this does not affect the implementation of the present disclosure.

In other words, the at least one entry of data summarized and organized by the router 10 can further include a media access control address of the user equipment 20 (for example, C0: 18:85: 1D: C1: 5D) and a physical port name used by the user equipment 20 to connect to the router 10 through the access point AP_1 (for example, Ethernet port E0 in FIG. 4), and in the step S240 that the analysis platform 30 analyzes the data, the analysis platform 30 can analyze the data based on the time stamp, the media access control address, and the physical port name of at least one entry of the data to obtain an analysis result indicating that the router is often connected by the user equipment 20 through the access point at a specific time (for example, from 08:00 to 15:00 on Monday to Friday), and in the step S260 that the analysis platform 30 forms the configuration file, the analysis platform 30 forms the configuration file of the router 10 according to the analysis result, and load the configuration file into the router 10, thereby configuring the router 10 to, according to the configuration file, configure the access point AP_1 to reserve a fixed bandwidth for the user equipment 20 to use at the specific time, or configure the access point AP_1 to prioritize processing of the network service required by the user equipment 20 at the specific time. Since other details have already been described in the above, the repeated descriptions are omitted hereinafter.

Figure 5:
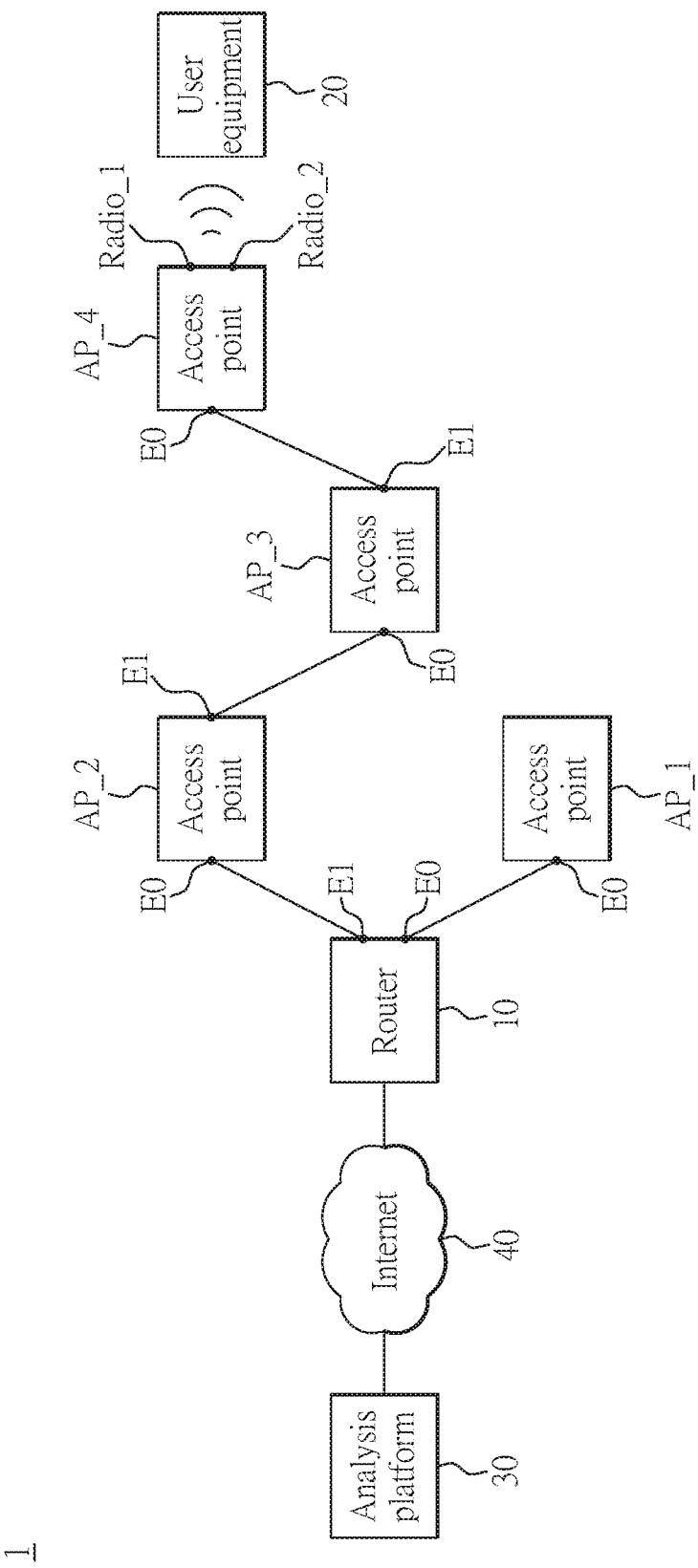
FIG. 5 is a block diagram of the routing system of FIG. 1A according to another preferred embodiment of the present disclosure.

Similarly, reference is made to FIG. 5. Different from the embodiment of FIG. 4, an example that the number of access points in FIG. 5 being four is taken, that is, the routing system 1 includes access points AP_1 to AP_4. It should be noted that, in order to enable the router 10 in FIG. 5 to be connected to the access point AP_1 and the access point AP_2 through the Ethernet, the router 10 in FIG. 5 further includes another Ethernet port E1, and the Ethernet port E1 of the router 10 is connected to the Ethernet port E0 of access point AP_2, and so forth. The access points AP_2 and AP_3 can also include another Ethernet port E1, the Ethernet port E1 of the access point AP_2 is connected to the Ethernet port E0 of the access point AP_3, and the Ethernet port E1 of the access point AP_3 is connected to the Ethernet port E0 of the access point AP_4.

If the foregoing content is taken as an example, in addition to the analysis platform 30 being able to obtain that the user equipment 20 is often connected to the router 10 through the access point AP_1 from 08:00 to 15:00 on Monday to Friday, the analysis platform 30 can also obtain that the user equipment 20 is often connected to the router 10 through the access points AP_2 to AP_4 from 17:00 to 23:00 on Monday to Friday. Therefore, the configuration file formed by the analysis platform 30 can also enable the router 10 to configure the access points AP_2 to AP_4 to reserve fixed bandwidths for the user equipment 20 to be used at the above time, or to configure the access points AP_2 to AP_4 to prioritize processing of the network service required by the user equipment 20 at the above time. For example, if the access point AP_3 further includes the Ethernet port E2, since the access point AP_3 knows that the user equipment 20 is connected by the Ethernet port E1 of the AP_3, the access point AP_3 can reserve the bandwidth for transmitting data through the Ethernet port E1 thereof. Since other details have already been described in the above, the repeated descriptions are omitted hereinafter.

Incidentally, in this embodiment, at least one physical or virtual button can be designed in the routing system 1 to allow the user to decide whether to start performing the foregoing method of automatically configuring the router 10. When a configuration file is formed by the analysis platform 30, the routing system 1 can notify the user to decide whether to load the configuration file into the router 10, or the analysis platform 30 can form more than one configuration files to allow the user to select one of the configuration files for loading. In summary, the above-mentioned behaviors do not affect the implement of the present disclosure.

In conclusion, the method for automatically configuring the router and the routing system provided by the embodiments of the present disclosure can continuously collect related data used by the user equipment to connect to the Internet. Specifically, each time when the user equipment connects to the Internet to request to perform network services, the router summarizes the time stamp, the Internet protocol address of the user device, and the service information of the network service into one of the entries of the data stored in the memory thereof, and the calculation model on the analysis platform is used for analysis. When the data is collected for a period of the time, or when the router is used for a period of the time, the analysis platform forms a configuration file of the router, and the analysis platform automatically loads this configuration file into the router. That is, the analysis platform actively modifies (updates) the configuration of the router, without requiring the user of the user equipment to manually modify the configuration of the router. In addition, the analysis platform can obtain online habits of the user equipment at different times based on the received data. Therefore, the analysis platform can automatically divide the configuration file into different sectors for modifying the configuration of the router at different times.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for automatically configuring a router executed in a routing system, wherein the routing system includes the router, a user equipment, and an analysis platform, and the method comprising:
    configuring the router to collect related data used by the user equipment to connect to Internet, and store the data in a memory of the router, wherein the data has a plurality of entries;
    configuring the router, in response to the router determining that a number of the plurality of entries of the data stored in the memory that has not been uploaded reaches a preset parameter, to upload the data of which the number of the plurality of entries is the preset parameter to the analysis platform;
    configuring the analysis platform to receive the data in batches and analyze the data in batches by using a computational model to generate a plurality of analysis results, and store the plurality of analysis results in the analysis platform; and
    configuring the analysis platform, in response to the analysis platform determining that a duration for the router to collect the data reaches a preset time, to form a configuration file of the router, and load the configuration file into the router, thereby making the router perform at least one configuration work according to the configuration file;
    wherein a step of configuring the router to collect the data further includes:
    the router is further configured, in response to the user equipment requesting to perform a network service while connecting to the Internet through the router, to retrieve an Internet protocol address of the user equipment and a service information of the network service from a packet transmitted from a wide area network interface to the Internet, and record a time stamp, the Internet protocol address, and the service information as one of the plurality of entries of the data;
    wherein the service information refers to a web address browsed by the user equipment, and a step of configuring the analysis platform to analyze the data further includes configuring the analysis platform to analyze the data based on the time stamp, the Internet protocol address, and the web address of at least one of the plurality of entries of the data to obtain the plurality of analysis results, in response to the plurality of analysis results indicating that the web address is often accessed by the user equipment at a specific time, the step of configuring the analysis platform to form the configuration file further includes: configuring the analysis platform to form the configuration file of the router according to the plurality of analysis results, and load the configuration file into the router, thereby configuring the router to, according to the configuration file, preload a content of the web address in advance before the specific time arrives, or adjust a bandwidth of the user equipment at the specific time;
    wherein the router further includes a physical port and a control circuit, the user equipment is connected to the router through the physical port, the control circuit is coupled between the physical port and the wide area network interface, and in response to adjusting the bandwidth of the user equipment at the specific time, the router is configured to manage a bandwidth of data transmission from the physical port to the control circuit and then to the Internet, or manage a bandwidth of data transmission from the Internet to the control circuit and then to the physical port.

2. The method according to claim 1, further comprising:
    configuring the router to be powered on; and configuring the router to count the operation time after the router is powered on.

3. The method according to claim 2, wherein the computational model is a machine learning algorithm model, a neural network model, or a deep learning algorithm model.

4. The method according to claim 1, wherein the analysis platform is integrated in the router or the analysis platform is implemented by a server, and the server is connected to the router through the Internet.

5. A routing system, comprising:
    a user equipment;
    an analysis platform; and
    a router configured to collect related data used by the user equipment to connect to Internet, and store the data in a memory of the router, wherein the data has a plurality of entries, and the router is configured, in response to the router determining a number of the plurality of entries of the data stored in the memory that has not been uploaded reaches a preset parameter, to upload the data of which the number of the plurality of entries is the preset parameter to the analysis platform;
    wherein the analysis platform is configured to receive the data in batches and analyze the data in batches by using a computational model to generate a plurality of analysis results, and store the plurality of analysis results in the analysis platform, and wherein in response to the analysis platform determining that a duration for the router to collect the data reaches a preset time, the analysis platform is configured to form a configuration file of the router, and load the configuration file into the router, thereby making the router to perform at least one configuration work according to the configuration file;
    wherein in a step that the router is configured to collect the data, the router is further configured, in response to the user equipment requesting to perform a network service while connecting to the Internet through the router, to retrieve an Internet protocol address of the user equipment and service information of the network service from a packet transmitted from a wide area network interface to the Internet, and record a time stamp, the Internet protocol address, and the service information as one of the plurality of entries of the data;

wherein in a step that the analysis platform is configured to analyze the data, the analysis platform is further configured to analyze the data based on the time stamp, the Internet protocol address, and the service information of at least one of the plurality of entries of the data to obtain the plurality of analysis results, wherein in response to the plurality of analysis results indicating that the Internet is often connected by the user equipment through the router at a specific time, the step that the analysis platform is configured to form the configuration file further includes: configuring the analysis platform to form the configuration file of the router according to the plurality of analysis results, and load the configuration file into the router, thereby configuring the router to, according to the configuration file, reserve a fixed bandwidth for the user equipment to use at the specific time, or prioritize processing of the network service required by the user equipment at the specific time;

wherein the router further includes a physical port and a control circuit, the user equipment is connected to the router through the physical port, the control circuit is coupled between the physical port and the wide area network interface, and in response to reserving the fixed bandwidth for the user equipment to use at the specific time, the router is configured to manage a bandwidth of data transmission from the physical port to the control circuit and then to the Internet, or manage a bandwidth of data transmission from the Internet to the control circuit and then to the physical port.

6. The routing system according to claim 5, wherein the router is configured to be powered on, and the router is configured to count the operation time after the router is powered on.

7. The routing system according to claim 6, wherein the computational model is a machine learning algorithm model, a neural network model, or a deep learning algorithm model.

8. The routing system according to claim 5, wherein the analysis platform is integrated in the router or the analysis platform is implemented by a server that is connected to the router through the Internet.

\* \* \* \* \*